455-612 AU 233 EX

FIP8106 XR 3,633,034

INV.: Uchida

[redacted]

T370-3

X5007C

X5009R

X370-53

X370-112

SD (4)

United Stat

[11] 3,633,034

[72] Inventors Teiji Uchida

Motoak

[21] Appl. No. 839,267

[22] Filed July 7, 1969

[45] Patented Jan. 4, 1972

[73] Assignee Nippon Selfoc Company Limited c/o Nippon Electric Company, Ltd., Tokyo, Japan

[32] Priorities July 6, 1968

[33] Japan

[31] 43/46960; July 6, 1968, Japan, No. 43/46961; July 6, 1968, Japan, No. 43/46962

[54] MULTIPLEXED OPTICAL COMMUNICATION SYSTEM

5 Claims, 6 Drawing Figs.

[52] U.S. Cl. .................................................. 250/199, 350/96 B, 350/175 BN

[51] Int. Cl. .................................................. H04b 9/00

[50] Field of Search .................................................. 250/199, 227; 350/96 B, 96 WG; 178/6 s Cited

UNITED STATES PATENTS

| | | | |
|---|---|---|---|
| 3,297,875 | 1/1967 | Garwin et al. | 350/96 |
| 3,360,324 | 12/1967 | Hora | 250/199 |
| 3,468,598 | 9/1969 | Ito | 350/96 |
| 3,130,263 | 4/1964 | Manning | 178/6 |

OTHER REFERENCES

Bell System Technical Journal, Vol. 43, No. 4 July, 1964), pg. 1,170

*Primary Examiner*—Benedict V. Safourek

*Attorney*—Sandoe, Hopgood and Calimafde

ABSTRACT: A time-division, space-division multiplex system employing a fibrous converging light guide having a specific reflective index distribution. Beams of coherent modulated light spatially multiplexed (and if desired, also time-division multiplexed) are impinged upon one end of the guide, each beam having a specific incident angle and position from the axis. The modulated beams are emitted in a spatially multiplexed fashion from the other end of the guide where they are detected.

PATENTED JAN 4 1972 3,633,034

INVENTORS
TEIJI UCHIDA
MOTOAKI FURUKAWA by Sandoe, Hopgood & Calimafde
ATTORNEYS.

MULTIPLEXED OPTICAL COMMUNICATION SYSTEM

BACKGROUND OF THE INVENTION

This invention relates to a multiplexed optical communication system and, more particularly, to a time-division- and space-division-multiplexed optical communication system employing a fibrous converging light guide.

In heretofore proposed space-division multiplex optical communication systems wherein two or more light beams are incident at different angles upon one end surface of a light transmission path (composed, for example, of a lens array) the spatial interval between neighboring lenses must be larger than a certain value to reduce the insertion loss caused by the optical system. For this reason, the number of optical beams which can be multiplexed is rather restricted. Also, the space occupied by the transmission path must be large, particularly because the transmission light beam should be large in cross section. Moreover, the installation of the transmission path is, as a practical matter, difficult, since a curved light path is hardly realizable with those conventional optical systems.

OBJECTS OF THE INVENTION

It is the object of the present invention to provide a novel multiplex optical communication system free from the aforementioned disadvantages.

It is another object of the invention to provide an optical communication system of the kind adapted to space-division- and time-division-multiplexed light wave transmission.

SUMMARY OF THE INVENTION

A multiplexed optical communication system of the present invention employs, in place of the lens array in the heretofore proposed systems, an optical fiber referred to as a fibrous converging light guide. Modulated coherent light beams are impinged upon one face of the guide at predetermined angles of incidence and preselected distances from the guide axis. At the other end of the guide, the separate angles and distances from the axis of the light beams permits spatially distinct demodulation.

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION OF THE INVENTION

Figure 1:
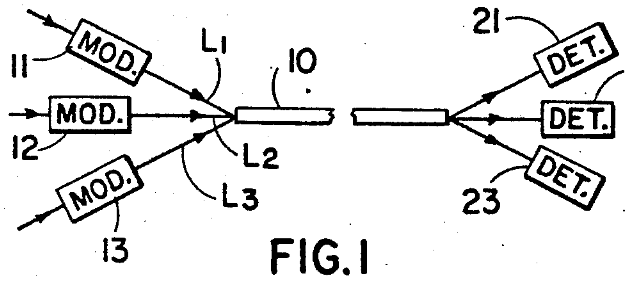
FIG. 1 shows schematically an embodiment of the present invention.

The invention employs a fibrous converging light guide which guides the light beam along its longitudinal axis and has a refractive index gradient in the radial direction normal to the axis. More specifically, the refractive index observed in a cross section normal to the axis is highest at the axis and gradually decreases toward the circumference. A light beam with a suitable size cross section which is incident upon one end of the light guide is transmitted therethrough in the axial direction oscillating about the axis, without being reflected at the internal surface and without substantial divergence. In The Bell System Technical Journal, Vol.43, No. 4 (July 1964), pp. 1,469–1,479, D. W. Berreman describes the transmission of a light beam without divergence in a long gas-filled pipe with the aforementioned refractive index distribution. The fibrous converging light guidé used in the invention is based on the same principle as the gas-filled pipe and is analogous.

With regard to a laser light beam of the fundamental mode of oscillation incident upon one end surface of a fibrous converging light guide, a specific spot size is determined as a function of the radial distribution of the refractive index of the converging light guide. In a paper published in The Bell System Technical Journal, Vol. 44, No. 9 (Nov. 1965), pp. 2,017–2,064, S. E. Miller defines the specific spot size $W_o$ as given by $(\lambda o/\lambda n_a)^{1/2}a_2^{1/4}$, assuming that a laser light beam of the fundamental mode is made incident at a suitable angle upon the light guide having the refractive index distribution defined by $n=n_a(1-\frac{1}{2}a_2x^2)$, where: $\lambda o$ is the light wavelength in free space; $n_a$, the refractive index at the axis of the light guide; $x$, the radial distance from the axis; and $a_2$, a positive constant.

It is now possible to produce a fibrous converging light guide having a diameter of the order of 200 microns with a positive constant $a_2$ of the order of 1 mm.$^{-2}$. The spot size $W_o$ for such a guide is approximately 12 microns.

The light path taken by a light beam incident upon one end surface of a light transmission medium of the aforementioned refractive index distribution is given by the expressions $$x=r_i\cos\sqrt{a_2z}+r_i'\sqrt{1/a_2}\sin\sqrt{a_2z},$$

and $$dx/dz=-r_i\sqrt{a_2}\sin\sqrt{a_2z}+r_i'\cos\sqrt{a_2z},$$

where: $x$ is the distance of the light path from the axis of the light guide; $z$ is the axial distance of the above point from the input end surface; $a_2$ is the above-mentioned constant; $r_i$ is the distance of the point of incidence of the light beam from the axis; and $r_i'$ is the input ray slope at the point of incidence (Miller, page 2,022).

Therefore, if the axial length $z$ of the converging light guide is equal to $N\pi/\sqrt{a_2}$ ($N$: an integer), the light beam incident upon the axis at one end surface with $r_i=0$ leaves the light guide at its output end surface at an angle equal to the angle of incidence. Similarly, if the length $z$ is equal to $(2N+1)\pi/2\sqrt{a_2}$, a light beam perpendicularly incident upon the input end surface leaves the light guide at the output end surface with $x\neq0$ at an angle dependent on the radial distance of the position of incidence from the axis at the input end surface.

It follows, therefore, that a space-division multiplex transmission is realizable employing a converging light guide of specific length and adjusting the angles of incidence at the input end surface of the light guide with respect to each of the coherent carrier light beams. Inasmuch as a laser can be regarded as a light pulse source and easily be adapted to the pulse modulation, each of the above-mentioned coherent carrier light beams may be time-division multiplex pulse-modulated light pulse trains. Thus, the present invention makes it possible to realize a time-division- and space-division-multiplexed light communication system.

The invention will now be described with reference to the accompanying drawings.

Figure 2:
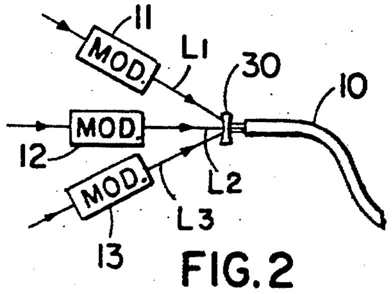
FIG. 2 shows a modification applicable to the embodiment of FIG. 1.

In FIGS. 1 and 2 the thin lines with arrows denote the optical paths of the laser light beams. Laser light beams supplied to the light modulators 11, 12 and 13 are separately modulated by the information signals to be transmitted and then made incident with the above-mentioned spot size via paths $L_1$, $L_2$, and $L_3$ upon the input end surface of the converging light guide 10. Each of the light wave modulators 11, 12 and 13 may be composed of a polarization-plane-rotating means and an analyzer as is known in this technical field.

If the length of the converging light guide 10 is chosen equal to the integral multiple of $\pi/\sqrt{a_2}$, the light beam incident upon the input end surface on the axis at an arbitrary angle leaves from the output end surface at an angle equal to the angle of incidence. Therefore, the light beams $L_1$, $L_2$, and $L_3$ separately leave the optical fiber 10 and are respectively demodulated at the corresponding light detectors 21, 22 and 23.

If the light beams $L_1$, $L_2$, and $L_3$ are, by means of the concave lens 30 (FIG. 2), made to impinge in parallel on the input end surface of the light guide 10 in a direction parallel to its axis, they leave the light guide in the direction parallel to the axis. Therefore, to separate the light beams $L_1$, $L_2$, and $L_3$ at the output end, another concave lens corresponding to the lens 30 must be inserted. However, if the length of the converging light guide 10 is chosen to be $(2N+1)\pi/2\sqrt{a_2}$ in the system of FIG. 2, the light beams $L_1$, $L_2$, and $L_3$ leave it separately at a slope proportional to the radial distance of the point of incidence at the input end surface from the axis of the light guide.

Even with the light guide 10 of the length $(2N+1)\pi/2\sqrt{a_2}$, the light beams $L_1$, $L_2$, and $L_3$ may be incident upon the input end surface at a certain angle as in the case of FIG. 1. Since the light beams $L_1$, $L_2$, and $L_3$ leave the light guide 10 in parallel with the axis in this case, a concave lens like lens 30 will be needed at the output end for separation purposes.

Figure 3:
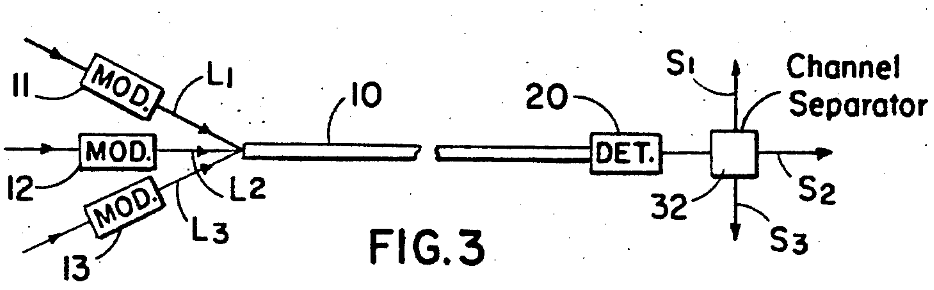
FIG. 3 is a schematic illustration of another embodiment of the present invention.
Figure 4:
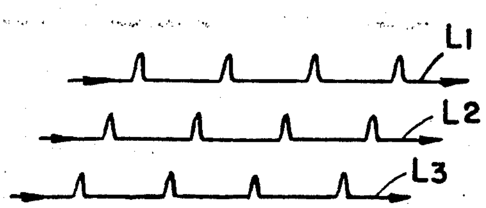
FIG. 4 is a waveform diagram for explaining the embodiment of FIG. 3.

In FIG. 3, wherein the like numerals stand for like constituent parts, there is illustrated another embodiment adapted to time-division multiplex transmission. Carrier light beams incident upon the light modulators 11, 12 and 13 are respectively modulated by the pulse information signals, and are then made incident with the aforementioned spot size upon input end surface of the transmission path 10. The modulated light pulse trains $L_1$, $L_2$, and $L_3$ have the predetermined phase differences at the input end surface of the path 10, as shown in FIG. 4.

The light beams transmitted through the transmission path of light guide 10 are led at the receiving end to the light detector 20 and converted into time-division-multiplexed electric pulse train, which is then applied to the channel separator or distributor 32 which may be composed of an electronic rotary switch. With a predetermined timing, the distributor 32 separates the multiplexed pulse train into three pulse trains $S_1$, $S_2$, and $S_3$.

Although not clearly illustrated in the drawing, a plurality of lenses may be inserted between the modulators and the input end surface of the transmission path of light guide 10 to accomplish fine control of the optical paths for light beams $L_1$, $L_2$, and $L_3$.

Figure 5:
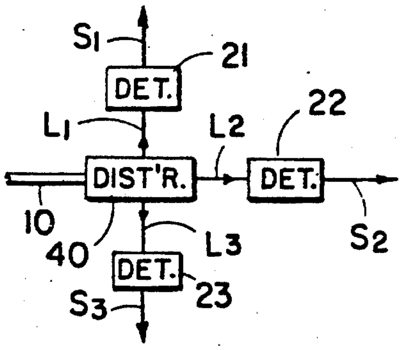
FIG. 5 shows a modification of the embodiment of FIG. 4.

Since it is only required for the receiver end equipment to convert the space and time-division-multiplexed optical signal into a plurality of time-division-multiplexed electrical signals, the channel separation may be carried out by the optical channel distributor 40 before the multiplexed light beam is converted into electrical signals, as shown in FIG. 5. In this case the separated light beams are demodulated at the light detectors 21, 22 and 23, separately.

Figure 6:
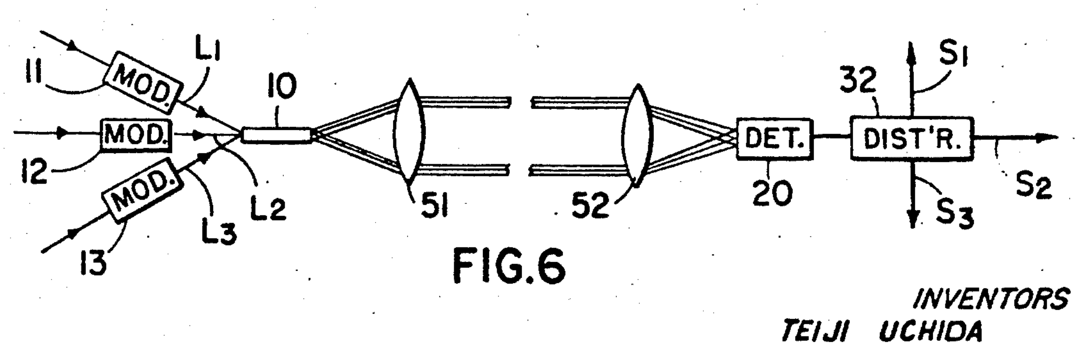
FIG. 6 shows a schematic diagram of still another embodiment of the invention.

In FIG. 6 wherein like numerals denote like constituent parts, the third embodiment employs the converging light guide only in a part of the total transmission path. The rest of the transmission path is formed of an array of lenses 51 and 52. In other words, the third embodiment is a modification of the second embodiment of FIG. 3 arranged by replacing almost the entire light guide transmission with the transmission through the atmosphere, and employing the lenses 51 and 52 as the transmitting and receiving antennas.

The modulated light pulse trains $L_1$, $L_2$, and $L_3$ have the predetermined phase differences at the input end surface of the optical path 10, as shown in FIG. 4. If the length of the self-converging optical fiber 10 is made equal to $(2N+1)\pi/2\sqrt{a_2}$, a light beam incident upon the input end surface of the light guide 10 at its axis and at a suitable angle of incidence within the range specific to the light guide 10, emerges from the output end surface in the direction parallel to the axis of the light guide 10. The radial distance at the output end surface from the axis to the emerging point depends on the angle of incidence and the constant $a_2$. Since the constant $a_2$ can easily be made large with a light guide of small diameter, the distance of a pair of emerging light beams observed at the output end surface can be made small when the diameter is small. Therefore, if a sufficiently thin converging light guide 10 is used in FIG. 6, three light beams $L_1$, $L_2$, and $L_3$ emerge from the output end surface of the light guide 10 in parallel with small spacing therebetween, and are directed to the transmitting optical antenna 51. To be precise, the transmission directions of the three output light beams of the antenna 51 are not parallel. However, the transmission directions may be said to be virtually parallel to make it possible to direct the transmission light beams from antenna 51 to 52.

Three light beams received at the receiving antenna 52 are converted by the photodetector 20 as the case with the second embodiment of FIG. 3. The modification of FIG. 5 is applicable to this embodiment as well.

In the above embodiments and modifications, the only restriction imposed on the incident light beams is that they have the aforementioned spot size and that the angle of incidence must be less than a certain value, such that the beams may be transmitted through the guide without multiple reflection at the surface thereof. The angle is about $n_o r\sqrt{a_2}$ radians, where $r$, $n_o$, and $a_2$ are the radius of the guide, the aforementioned refractive index, and the constant, respectively. The number of the light beams is therefore not limited as long as the space admits, if the angle of incidence of the light beam is in the range peculiar to the transmission path 10. Since the transmitting and receiving antennas 51 and 52 are employed only for focusing of the light beam to the optimum spot size, they may be replaced by a combination of several equivalent optical systems.

In the second and third embodiment, the light beams are multiplexed in the time-division fashion; the multiplexing may also rely upon the separate planes of polarization of carrier light waves, particularly when the bit rate of the modulated laser light beams can not be made sufficiently high because of the restrictions imposed by the overall frequency bandwidth and/or the optical length of the optical resonator of the laser light source. Further, time-division multiplexing may be resorted to simultaneously with the polarization-plane-multiplexing. Thus, the present invention greatly contributes to the higher multiplexing of the optical communication channels.

While the principles of the invention have been described in connection with specific apparatus, it is to be clearly understood that this description is made only by way of example and not as a limitation to the scope of the invention.

What is claimed is:

1. A multiplexed optical communication system comprising:

a fibrous converging light guide forming at least a part of a transmission path for said communication system, the refractive index $n$ on the cross section of said guide at a point of distance $x$ from the axis thereof being defined approximately by the expression $n=n_o(1-\frac{1}{2}a_2x^2)$ where $n_o$ is the refractive index at said axis and $a_2$ is a positive constant, the length of said light guide being $N\pi/2\sqrt{a_2}$, where $N$ is an integer;

means for impinging a plurality of coherent light beams, each modulated by an information signal to be transmitted, incident upon one end surface of said light guide respectively at predetermined angles of incidence and respectively at points of preselected distances from said axis, so that said light beams may be transmitted therethrough, each such light beam following a separate light path from one another; and means for separately demodulating said coherent light beams separately emanating from the other end surface of said light guide at angles and distances respectively related to those at said one end surface.

2. A multiplexed optical pulse communication system comprising:

a fibrous converging light guide, the refractive index $n$ on the cross section of said guide at a point of distance $x$ from the axis thereof being defined approximately by the expression $n=n_o(1-\frac{1}{2}a_2x^2)$ where $n_o$ is the refractive index of said axis and $a_2$ is a positive constant;

means for impinging a plurality of light pulse trains, each modulated by modulating pulse signals to be transmitted, incident upon one end surface of said light guide respectively, said trains having specific phase differences maintained between said pulse signals;

means for demodulating said coherent light beams emanating from the other end surface of said light guide to reproduce said information signals in the time-division multiplex fashion; and means for separating in space domain said modulating signals into a plurality of channel information signals.

3. The multiplexed optical pulse communication system claimed in claim 2, wherein the length of said guide is $N\pi/2\sqrt{a_2}$), where $N$ is an integer.

4. A multiplexed optical pulse communication system comprising:

a fibrous converging light guide, the refractive index $n$ on the cross section of said guide at a point of distance $x$ from the axis thereof, being approximately defined by the expression $n=n_a\ (1-\frac{1}{2}a_2x^2)$ where $n_a$ is the refractive index at said axis and $a_2$ is a positive constant, the length of said light guide being $N\pi/2\sqrt{a_2}$, where $N$ is an integer;

means for impinging a plurality of coherent light beams, respectively modulated with modulating pulse signals, incident upon one end surface of said light guide with specific phase differences maintained between said pulse signals;

a transmitting optical antenna system for launching said modulated light beams emerging from the other end surface of said light guide into a media;

a receiving optical antenna system for receiving light beams from said transmitting antenna;

means coupled to said receiving antenna for detecting said modulated light beams in a time-division fashion; and means for separating said detected signals in space domain.

5. The multiplexed optical pulse communication system claimed in claim 4, wherein the length of said guide is $N\pi/2\sqrt{a_2}$, where $N$ is an integer.

* * * * *